US012169355B2

(12) United States Patent
Der Kinderen et al.

(10) Patent No.: US 12,169,355 B2
(45) Date of Patent: Dec. 17, 2024

(54) PHOTOGRAPHIC PAPER

(71) Applicant: Fujifilm Manufacturing Europe B.V., Tilburg (NL)

(72) Inventors: Wilhelmus Johannes Martinus Der Kinderen, Tilburg (NL); Mattijs De Munnik, Tilburg (NL); Dennis Imre Lubertus Termeczky, Tilburg (NL); Elisabeth Maria Waltherus Van Limpt, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 26 days.

(21) Appl. No.: 17/995,870

(22) PCT Filed: Mar. 23, 2021

(86) PCT No.: PCT/EP2021/057426
§ 371 (c)(1),
(2) Date: Oct. 10, 2022

(87) PCT Pub. No.: WO2021/213762
PCT Pub. Date: Oct. 28, 2021

(65) Prior Publication Data

US 2023/0244134 A1 Aug. 3, 2023

(30) Foreign Application Priority Data

Apr. 24, 2020 (GB) ..................................... 2006061

(51) Int. Cl.

| | |
|---|---|
| ***G03C 1/85*** | (2006.01) |
| ***D21H 19/40*** | (2006.01) |
| ***D21H 19/72*** | (2006.01) |
| ***G03C 1/79*** | (2006.01) |

(52) U.S. Cl.
CPC ............. *G03C 1/853* (2013.01); *D21H 19/40* (2013.01); *D21H 19/72* (2013.01); *G03C 1/79* (2013.01)

(58) Field of Classification Search
CPC .......... D21H 19/40; D21H 19/72; G03C 1/79; G03C 1/853
See application file for complete search history.

(56) References Cited

U.S. PATENT DOCUMENTS 5,212,005 A 5/1993 Uehara
5,723,276 A * 3/1998 Shaw-Klein ........... G03C 1/853 430/528
2003/0022113 A1* 1/2003 Goto ........................ G03C 5/31 430/529

FOREIGN PATENT DOCUMENTS

EP 0361948 A1 4/1990
JP H10-268464 A * 10/1998
WO 2004114014 A1 12/2004
WO 2012035314 A1 3/2012

OTHER PUBLICATIONS

Machine Translation of JP H10-268464 A (Year: 1998).*

* cited by examiner

*Primary Examiner* — Christopher M Polley
*Assistant Examiner* — Sathavaram I Reddy
(74) *Attorney, Agent, or Firm* — Banner & Witcoff, Ltd.

(57) ABSTRACT

A photographic paper comprising a base layer having an average surface roughness (Sa) of at least 0.7 pm and an outer-most layer comprising a hydrophilic colloid binder and colloidal silica, wherein: (i) the weight ratio of colloidal silica to hydrophilic colloid binder in the outer-most layer is 0.05:1 to 0.28:1; and (ii) the amount of colloidal silica present in the outer-most layer is in the range of 8 mg/m2 to 280 mg/m2. The photographic paper is useful for preparing 'non-noisy' photobooks.

16 Claims, No Drawings

PHOTOGRAPHIC PAPER

RELATED APPLICATIONS

This application is a National Stage Application under 35 U.S.C. 371 of co-pending PCT application PCT/EP2021/057426 designating the United States and filed Mar. 23, 2021; which claims the benefit of GB application number 2006061.2 and filed Apr. 24, 2020; each of which are hereby incorporated by reference in their entireties.

This invention relates to a photographic paper, its preparation and use for making album-books.

Typically photographic paper comprises a base layer coated with one or more layers of light-sensitive chemicals. For colour photography, the paper will typically comprise three light-sensitive emulsion layers (yellow, magenta and cyan) to provide a full colour image, optionally with other layers.

During manufacture and storage, photographic papers can suffer from the problem of sticking together, due to the inherent stickiness of their outer-most layer.

In use, photographic paper is exposed to light in a controlled manner to generate an image thereon, for example using an image obtained on a camera film or using a digital image. The desired image then develops and the resultant photographic paper carrying the desired image is often referred to as a photograph. The photograph may be stacked along with other photographs, 'back-to-back', and handed or posted to the photographer. Thereafter, it is quite common for the photograph (i.e. the photographic paper carrying the desired image) to be included in an album-book where the photographs contact each other in a 'face-to-face' manner as a result of being on opposite pages. This 'face-to-face' contact can cause problems, particularly when the album-book is stored under hot and/or humid conditions. The photographs are prone to sticking together, causing them damage when pages of the album-book are opened, sometimes spoiling irreplaceable family pictures.

One method for preventing photographs from sticking to each other in album books is to place an interfoil of light paper as a barrier between the photographs. However this makes the album more expensive, the interfoil is prone to damage and it interferes with the easy viewing of two open pages at once. It is also possible for photographs to stick to the interfoil.

EP2619628 addressed the problem of photographic paper sticking together, especially photographic paper carrying images stored in album-books or other environments.

Photobooks comprising a rough base layer (i.e. an average surface roughness (Sa) of at least 0.7 μm) suffer from the problem of a noise (e.g. a squeaking sound) being generated when pages are turned, bent and/or moved. The noise problem does not usually occur when the base layer is smooth (e.g. as is used for producing glossy photobooks) but when rough base layers are used to prepare photobooks having a silk, lustre or matte finish the noise during page turning can be distracting and disliked by customers. The present invention addresses the problem of reducing the volume of such noises in non-glossy photobooks or eliminating them entirely.

According to the present invention there is provided photographic paper comprising a base layer having an average surface roughness (Sa) of at least 0.7 μm and an outer-most layer comprising a hydrophilic colloid binder and colloidal silica, wherein:

(i) the weight ratio of colloidal silica to hydrophilic colloid binder in the outer-most layer is 0.05 to 0.28; and (ii) the amount of colloidal silica present in the outer-most layer is in the range of 8 mg/m$^2$ to 280 mg/m$^2$.

The components of the photographic paper depend to some extent on whether an image has been developed thereon, i.e. whether or not the photographic paper has been used. Before an image is developed on the photographic paper, it typically comprises a base layer (e.g. polyester or resin-coated paper), one or more light-sensitive emulsion layers (e.g. layers which generate yellow, magenta or cyan colours) and the aforementioned outer-most layer on top of the one or more light-sensitive emulsion layers. After an image has been developed, the photographic paper typically comprises the same components except that the light-sensitive layers are no longer light sensitive, having been exposed to light in a controlled manner to develop the desired image thereon.

Preferably the mean particle size of the colloidal silica is in the range 2 to 70 nm, more preferably 2.5 to 9 nm, especially 3 to 7 nm. This preference arises because colloidal silica having a mean particle size below 2 nm can increase the viscosity of coating solutions, leading to longer manufacturing times for the photographic paper or the requirement for expensive viscosity reducing agents to be included in coating compositions.

Preferably the outer-most layer comprises 10 mg/m$^2$ to 260 mg/m$^2$, more preferably 40 mg/m$^2$ to 225 mg/m$^2$, especially about 150 mg/m$^2$ of the colloidal silica.

The photographic papers of the present invention have a low or no tendency to stick together and may be prepared conveniently at high speeds above 200 m/min using, for example, a slide coater or a curtain coater.

As the function of the outer-most layer of the present invention is to reduce the noise made when turning, bending and/or moving pages of the photographic paper in a photobook, the outer-most layer generally does not include any silver halide.

The colloidal silica preferably consists essentially of silicon dioxide. Optionally the colloidal silica may contain, as a minor component, alumina or sodium aluminate, e.g. in an amount of 0 to 0.1 g per g of the silicon dioxide. The colloidal silica optionally comprises, as a stabilizer, an inorganic base, for example sodium hydroxide, potassium hydroxide, lithium hydroxide or ammonia, or an organic base such as a tetraethylammonium salt.

The colloidal silica can be employed in the form of a colloidal dispersion of fine particles of silica in a medium such as water or an organic liquid, for example, methanol, ethanol, propanol, butanol, acetone, ethyl acetate or butyl acetate.

Preferred in this invention is the use of silicate sol or silicic acid sol in a water environment. However the weight of other components (e.g. water, organic liquid etc.) are not taken into account when calculating the weight ratio of colloidal silica to hydrophilic colloid binder.

Examples of commercially available products comprising colloidal silica include Levasil™ 300 and Levasil™ 500 from H. C. Starck. According to the manufacturer's catalogue these products contain colloidal silica having mean particle sizes of 9 nm and 6 nm respectively and surface areas of 300 g/m$^2$ and 450 g/m$^2$ respectively. Also Bindzil™ 30/360 may be used (7 nm). Other commercially available colloidal silicas include NexSil™ 5 (6 nm) and NexSil™ 8 (8 nm) from Nyacol Nano Technologies, Inc. The colloidal silicas may be surface-treated if desired.

Preferably the weight ratio of colloidal silica to hydrophilic colloid binder in said outer-most layer is (0.06 to 0.10) to (0.13 to 0.27).

We have found that the outer-most layer provides photographic papers having silk, lustre or matte finish which are much less noisy when used in a photobook without detracting from the physical appearance of the images they carry. Furthermore, the viscosity of compositions required to provide the above colloidal silica loadings are generally low enough at high shear rates to be applied to a base layer carrying one or more light-sensitive emulsion layers in one step in a multi-layer coating method, e.g. at speeds higher than 150 m/min using a slide coater or curtain coater. Speeds higher than 200 m/min (i.e. for example 300 m/min or 350 m/min) may even be achieved.

The photographic papers of the present invention also have good writability. In other words, the papers are receptive to subsequent marking with ink and even with pencil. The hydrophilic colloid binder preferably is or comprises a gelatin. Preferred gelatins include acid-processed gelatin, mixtures comprising acid-processed gelatin and alkali-processed gelatin and optionally other hydrophilic binders.

Preferred acid-processed gelatins include gelatins produced by treating collagen with hydrochloric acid, etc., and differ from the typical alkali-processed gelatins used in the photographic industry. Details of the processes for producing acid- and alkali-processed gelatins and the properties thereof are described in Arthus Veis, The Macromolecular Chemistry of Gelatin, pages 187-217, Academic Press (1964). Preferred acid-processed gelatins have an isoelectric point at a pH of about 6.0 to 9.5, whereas alkali-processed gelatin typically have an isoelectric point at a pH of about 4.5 to 5.3.

The hydrophilic colloid binder preferably comprises an acid-processed gelatin and a further hydrophilic binder other than an acid-processed gelatin, e.g. an alkali-processed gelatin, an enzyme-processed gelatin or a gelatin derivative. Gelatin derivatives may be prepared by treating and modifying the functional groups contained in the gelatin molecule with chemicals other than simple acids and alkalis. For example, amino groups, imino groups, hydroxyl groups or carboxyl groups normally present in gelatin may be reacted with a compound having a group capable of reacting with such a functional group. One may also graft a polymer or another high molecular weight material to gelatin in order to make a gelatin derivative. Compounds having groups capable of reacting the functional groups in gelatin include, for example, isocyanates, acid chlorides and acid anhydrides, e.g. as described in U.S. Pat. No. 2,614,928; acid anhydrides as described in U.S. Pat. No. 3,118,766; bromoacetic acids; phenylglycidyl ethers; vinylsulfone compounds, e.g. as described in U.S. Pat. No. 3,132,945; N-allylvinylsulfonamides, e.g. as described in GB 861,414; maleinimide compounds, e.g. as described in U.S. Pat. No. 3,186,846; acrylonitriles, e.g. as described in U.S. Pat. No. 2,594,293; polyalkylene oxides, e.g. as described in U.S. Pat. No. 3,312,553; epoxy compounds; acid esters, e.g. as described in U.S. Pat. No. 2,763,639; alkane sulphones, e.g. as described in GB 1,033,189; and the like.

In addition, suitable hydrophilic colloid binders include proteins, e.g. colloidal albumin and casein; cellulose derivatives, e.g. carboxymethyl cellulose and hydroxyethyl cellulose; polysaccharides, e.g. agar-agar, sodium alginate, dextran, gum arabic and starch derivatives; and synthetic hydrophilic colloids, e.g. polyvinyl alcohol, poly-N-vinylpyrrolidone, polyacrylic acid copolymer, polymethacrylic acid copolymer, polyacrylamide and polymethacrylamide; and mixtures and derivatives thereof. If desired, a compatible mixture comprising two or more of these hydrophilic colloid binders can be used. Of the above-described hydrophilic colloid binders, gelatin derivatives and synthetic high molecular weight materials having carboxyl group or salt thereof are particularly preferred.

There are no particular restrictions on the mixing ratio of acid to processed gelatin and the above-described other hydrophilic colloid binders, but in order to obtain particularly good results, the hydrophilic colloid binder preferably comprises at least 20 wt %, more preferably at least 40 wt % acid-processed gelatin. When the hydrophilic colloid binder comprises at least 20 wt % of acid-processed gelatin is less than about 20 wt %, and alkali-processed gelatin, enzyme-processed gelatin or a gelatin derivative is not present as part of the hydrophilic colloid binder, compositions used to apply the outer-most layer to the substrate set (solidify) particularly well, improving the likelihood that a uniform and smoothly coated surface will result.

The said outer-most layer preferably comprises 0.2 to 1.5 $g/m^2$ of hydrophilic colloid binder.

The photographic paper of the present invention preferably comprises 4 to 10 $g/m^2$, preferably 5 to 8 $g/m^2$, of hydrophilic colloid binder.

Optionally the outer-most layer comprises one or more further ingredients, for example a matting agent, hardening agent, lubricant, surface active agent and/or or pH-regulator.

Examples of suitable matting agents include certain organic compounds, e.g. water-dispersible vinyl polymers, e.g. polymethylacrylate, polymethylmethacrylate and/or polystyrene, and certain inorganic compounds, e.g. silver halide, strontium barium sulphate, magnesium oxide and/or titanium oxide.

In an especially preferred in an embodiment the outer-most layer further comprises polymethyl methacrylate (PMMA), especially PMMA having a mean size of 3 to 10 microns (e.g. 4 microns), preferably in an amount of 2 to 50 $mg/m^2$ (e.g. 10 $mg/m^2$).

As lubricants one may use, for example, a wax, liquid paraffin, a higher fatty acid esters, a polyfluorinated hydrocarbon or derivative thereof, a silicone such as polyalkylpolysiloxane, polyarylsiloxane, polyalkylarylpolysiloxane and/or an alkyleneoxide adduct thereof.

In one embodiment the outer-most layer comprises one or more hardening agents. Such hardening agents may be included to enhance the physical strength of an outer-most layer. Specific examples of suitable hardening agents include aldehyde compounds, e.g. formaldehyde and glutaraldehyde; ketone compounds, e.g. diacetyl and cyclopentanedione; compounds containing reactive halogens, e.g. bis(2-chloroethylurea) and 2-hydroxy-4,6-dichloro-1,3,5-triazine; the compounds described in U.S. Pat. Nos. 3,288,775, 2,732,303, GB 974,723 and GB 1,167,207; reactive olefin compounds, e.g. divinyl sulfone, 5-acetyl-1,3-diacryloylhexahydro-1,3,5-triazine and the compounds described in U.S. Pat. Nos. 3,635,718, 3,232,763 and GB 994,869; N-methylol compounds, e.g. N-hydroxymethylphthalimide and compounds described in U.S. Pat. Nos. 2,732,316 and 2,586,168; isocyanates, e.g. as described in U.S. Pat. No. 3,103,437; aziridine compounds, e.g. as described in U.S. Pat. Nos. 3,017,280 and 2,983,611; the acid derivatives described in U.S. Pat. Nos. 2,725,294 and 2,725,295; carbodiimide compounds, e.g. as described in U.S. Pat. No. 3,100,704; epoxy compounds, e.g. as described in U.S. Pat. No. 3,091,537; isooxazole compounds, e.g. as described in U.S. Pat. Nos. 3,321,313 and 3,543,292; halocarboxyaldehydes, e.g. mucochloric acid; dioxane derivatives, e.g. dihydroxydioxane and dichlorodioxane; and inorganic hardening agents, e.g. chrome alum and zirconium sulfate. Moreover, in place of the above compounds, hardening agent precursors such as alkali metal bisulfite-aldehyde adducts, methylol derivatives of hydantoin and primary aliphatic nitroalcohols can be used. A particularly preferred hardening agent is 1-oxy-3,5-dichloro-s-triazine and salts thereof, e.g. the sodium salt.

It is preferred that the ratio (R) of hardening agent to total hydrophilic colloid binder satisfies the following equation:

$$R=(Hmol/HCg)$$

wherein:

R is greater than 0.00013;

Hmol is the total number of moles of hardening agent; and

HCg is the weight in grams of hydrophilic colloid binder.

The above preference for R is particularly so when the outer-most layer comprises a hardening agent. While the above preference is expressed in terms of the outer-most layer, there is also a preference for the photographic paper as a whole (i.e. not just the outer-most layer) to have a ratio (R) of hardening agent to hydrophilic colloid binder as defined above.

In the above equation, the weight of hydrophilic colloid binder is in grams on a 100% solids basis. For example, when the hydrophilic colloid binder is a gelatin, as is preferred, the weight of any water present in the binder is not included when calculating the weight of hydrophilic colloid binder in grams. One may calculate the weight of hydrophilic colloid binder on a 100% solids basis by, for example, drying it to remove any water or organic solvents to find its strength and multiplying the strength against the amount used.

Preferably R has a value of 0.00014 to 0.00018.

When R has the values mentioned above the resultant photographic paper will often benefit from an improved ability to peel-apart from another sheet of photographic paper, without significantly damaging images, after being stored together in a face-to-face manner. We refer to this as "improved peeling behaviour".

Surface active agents can also be included in the outermost layer, individually or as a mixture thereof, e.g., in an amount of from about 0.5 to 50 mg, preferably 1 to 20 mg, per g of hydrophilic colloidal binder. They are generally used as a coating aid for preventing the occurrence of difficulties such as unevenness in coating, but they are sometimes employed for other purposes, for example, for improving emulsification and dispersion, for preventing the formation of static charges. These surface active agents can be classified as natural surface active agents, e.g. such as saponin; nonionic surface active agents, e.g. such as alkylene oxide, glycerol and glycidol nonionic surface active agents; cationic surface active agents, e.g. such as higher alkylamines, quaternary ammonium salts, pyridinium and other heterocyclic onium salts, phosphoniums and sulfoniums; anionic surface active agents containing acid groups, e.g. such as carboxylic acid, sulfonic acid, phosphoric acid, sulfuric ester or phosphoric ester groups; and amphoteric surface active agents, e.g. such as amino acids, aminosulfonic acids, or sulfuric or phosphoric esters of aminoalcohols.

The surface active agents which can be used are described in, for example, U.S. Pat. Nos. 2,271,623, 2,240,472, 3,441,413, 3,442,654, 3,475,174 and 3,545,974, German Patent Application (OLS) No. 1,942,665 and GB 1,077,317 and GB 1,198,450, as well as in Ryohei Oda et al., Synthesis and Applications of Surface Active Agents, Maki Publisher (1964), A. M. Schwartz et al., Surface Active Agents, Interscience Publications In. (1958), and J. P. Sisley et al., Encyclopedia of Surface Active Agents, Vol. 2, Chemical Publishing Company (1964).

The photographic paper of this invention optionally contains the following components and can be prepared by the production methods described below.

Silver halide emulsions for light-sensitive emulsion layer(s) are usually prepared by mixing a solution of a water-soluble silver salt (such as silver nitrate) with a solution of a water-soluble halide (such as potassium bromide or sodium chloride) in the presence of a solution of a water-soluble high molecular weight material such as gelatin. Silver halides which can be used include silver chloride, silver bromide, as well as mixed silver halides such as silver chlorobromide, silver bromoiodide or silver chlorobromoiodide. The silver halide grains can be prepared using conventional methods. Of course, the grains can be advantageously prepared using the so-called single or double jet method, controlled double jet method, and the like. Moreover, two or more of silver halide photographic emulsions, separately prepared, can be mixed, if desired.

The crystal structure of the silver halide grains can optionally be uniform throughout the grain, can have a stratified structure in which the interior and outer portion are different, or can be of the so-called conversion type as described in British Pat. No. 635,841 and U.S. Pat. No. 622,318. In addition, the silver halides can be of the type in which a latent image is formed mainly on the surface of the grains or of the type in which a latent image is formed in the interior of the grains thereof.

The above photographic emulsions are described, e.g., in C. E. K. Mees & T. H. James, The Theory of the Photographic Process, 3rd Ed., Macmillan, New York (1966); P. Grafkides, Chimie Photographique, Paul Montel, Paris (1957); etc., and can be prepared using various methods which are usually employed such as an ammonia process, a neutral process or an acid process.

Especially preferred are the silver halide grains as prepared and described in U.S. Pat. No. 6,949,334.

The silver halide grains may, after the formation thereof, be washed with water to remove the water-soluble salts produced as by-products (for example, potassium nitrate when silver bromide is prepared using silver nitrate and potassium bromide) from the system and then heat treated in the presence of a chemical sensitizer such as sodium thiosulfate, N,N,N'-trimethylthiourea, gold(I) thiocyanate complex, gold(I) thiosulfate complex, stannous chloride or hexamethylenetetramine to increase the sensitivity without coarsening the grains. Conventional sensitizing methods are described in Mees and James, supra, and Grafkides, supra.

Hydrophilic colloids which can be used as a vehicle for silver halide include gelatin, colloidal albumin, casein, cellulose derivatives such as carboxymethyl cellulose or hydroxyethyl cellulose, polysaccharides such as agar-agar, sodium alginate or starch derivatives, and synthetic hydrophilic colloids such as polyvinyl alcohol, poly-N-vinylpyrrolidone, polyacrylic acid copolymers or polyacrylamide, and the derivatives thereof and the partially hydrolyzed products thereof. If desired, a compatible mixture of two or more of these hydrophilic colloids can be used. Of the above-described hydrophilic colloids, gelatin is most generally used, but gelatin can be, partially or completely, replaced with a synthetic high molecular weight material. Furthermore, the gelatin can be replaced with a so-called gelatin derivative, e.g. as described above.

In the photographic emulsion layer(s) and other layers which may be used in this invention, synthetic polymer compounds such as a latex of water-dispersible vinyl compound polymers, particularly, compounds increasing the dimensional stability of the photographic material can be incorporated as such or as a mixture (e.g., of different polymers), or in combination with hydrophilic colloids which are permeable to water. Many such polymers are known, and are described, e.g., in U.S. Pat. Nos. 2,375,005, 3,607,290 and 3,645,740, British Pat. Nos. 1,186,699 and 1,307,373, etc. Of these polymers, copolymers or homopolymers of alkyl acrylates, alkyl methacrylates, acrylic acid, methacrylic acid, sulfoalkyl acrylates, sulfoalkyl methacrylates, glycidyl acrylate, glycidyl methacrylate, hydroxyalkyl acrylates, hydroxyalkyl methacrylates, alkoxyalkyl acrylates, alkoxy methacrylates, styrene, butadiene, vinyl chloride, vinylidene chloride, maleic anhydride and itaconic anhydride are generally used. If desired, the so-called graft-type emulsion-polymerized latices of these vinyl compounds which are prepared by subjecting such a vinyl compound to emulsion polymerization in the presence of a hydrophilic protective colloid high molecular weight material can be used.

The photographic papers of the present invention generally contain one or more light-sensitive, silver halide emulsion layers between the outer-most layer and a base layer. The silver halide emulsion layer(s) can be sensitized in a conventional manner. Suitable chemical sensitizers include, e.g., gold compounds, e.g. such as chloroaurate or auric trichloride as described in U.S. Pat. Nos. 2,399,083, 2,540,085, 2,597,856, 2,597,915 and 6,949,334; salts of noble metals, e.g. such as platinum, palladium, iridium, rhodium or ruthenium as described in U.S. Pat. Nos. 2,448,060, 2,540,086, 2,566,245, 2,566,263, 2,598,079 and 6,949,334 and sulfur compounds capable of forming silver sulfide by reacting with a silver salt, e.g. as described in U.S. Pat. Nos. 1,574,944, 2,410,689, 3,189,458 and 3,501,313; stannous salts, e.g. as described in U.S. Pat. Nos. 2,487,850 and 2,518,698; amines; and other reducing compounds. Preferred techniques are gold sensitization, sulfide and/or Iridium sensitization as described in U.S. Pat. No. 6,949,334 with general formula (i) on page 12. For the gold sensitization, auro (I) complex having various inorganic gold compounds or inorganic ligands, and auro (I) compound having organic ligands can be used if desired.

For the inorganic gold compound, chloroauric acid or the salt thereof can be used for instance. For the auro (I) complex having inorganic ligands, auro dithiocyanate compounds such as potassium auro (I) dithiocyanate and auro dithiosulfate compound such as trisodium auro (I) dithiosulfate can be used, for example.

Further, auro (I) thiolate compound described in U.S. Pat. No. 3,503,749, gold compounds described in JP-A Nos. 8-69074, 8-69075, and 9-269554, U.S. Pat. Nos. 5,620,841, 5,912,112, 5,620,841, 5,939,245 and 5,912,111 can also be used.

Various compounds can be added to the emulsion layer(s) of the photographic paper in order to prevent a reduction in sensitivity and the occurrence of fog during production of the photographic paper, during storage, and during processing. Many such compounds are known, for example, 4-hydroxy-6-methyl-1,3,3a, 7-tetraazaindene, 3-methylbenzothiazole, 1-phenyl-5-mercaptotetrazole, 5-arylamino-1,2,3,4-thiatriazole, as well as a large number of heterocyclic compounds, mercury-containing compounds, mercapto compounds, metal salts, and the like. Examples of such compounds which can be used are described in C. E. K. Mees & T. H. James, supra and the original references cited therein, and also in the following patents: U.S. Pat. Nos. 1,758,576, 2,110,178, 2,131,038, 2,173,628 and GB 893,428, 403,789, 1,173,609 and 1,200,188 and EP 447,647. Especially preferred for improving the storability of the silver halide emulsion, the following compounds are preferably used also in the present invention: hydroxamic acid derivatives described in JP-A No. 11-109576, cyclic ketones having double bonds substituted for an amino group or a hydroxyl group on both ends adjacent with a carbonyl group described in JP-A No. 11-327094 (particularly, those represented by the general formula (S1); descriptions in column Nos. 0036 to 0071 can be incorporated in the present specification), sulfo-substituted cathecol or hydroquinones described in JP-A No. 11-143011 (for example, 4,5-dihydroxy-1,3-benzenedisulfonic acid, 2,5-hydroxy 1,4-benzenedisulfonic acid, 3,4-dihydroxybenzenesulfonic acid, 2,3-dihydroxybenzenesulfonic acid, 2,5-dihydroxybenzenesulfonic acid, 3,4,5-trihydroxybenzenesulfonic acid and salts thereof), hydroxylamines represented by the general formula (A) in the specification U.S. Pat. No. 5,556,741 (descriptions in column 4, line 56 to column 11, line 22 of the specification of the U.S. Pat. No. 556,741 can be applied preferably also in the present invention and can be incorporated as a portion of the specification of the present application), and water soluble reducing agents represented by the general formulae (I) to (III) in JP-A No. 11-102045.

The light-sensitive emulsion layer(s) can be, if desired, spectrally sensitized or supersensitized using cyanine dyes such as cyanine, merocyanine or carbocyanine individually or in admixture, or in combination with, e.g., styryl dyes. Such colour sensitization techniques are known in the art.

The light-sensitive emulsion layers can be hardened if desired using a hardening agent. Examples of suitable hardening agents are mentioned above.

The emulsion layer(s) optionally contain surface active agents, individually or in admixture.

Preferably the base layer has a silky, luster or matt appearance.

Preferably the base layer has a specular gloss of less than 60%, more preferably from 20 to 50%, when measured at an angle of 60 degrees by the method of JIS Z8741.

Preferably base layer comprises a paper, especially a laminated paper. Preferably the base layer comprises a structured, laminated paper.

Preferably the base layer comprises multiple pits and/or peaks. In this way, the base layer will have a non-glossy appearance (e.g. a silky, lustre or matte appearance). One may obtain a suitable base layer (e.g. a base layer having the desired specular gloss, roughness, pits, structure or lamination) by, for example, extrusion coating a polymer onto a paper base layer. The extrusion material (i.e. the polymer), which is typically in the form of granules, grains or powder, may be compacted, melted and homogenized in an extruder. The molten extrusion material may then be applied to a paper substrate by means of an extrusion die, which is adapted to the width of a paper web. The paper may be pretreated to achieve good bonding strength with the polymer. Flame pretreatment, corona treatment, an ozone shower or primer application may also be used to improve adhesion of the polymer to the paper. The extruded polymer film may then be cooled by means of a chill roll. The surface profile of this chill roll also has a significant influence on the surface of the resultant base layer and one may use surface rollers having a rough surface profile in order to obtain a base layer having the desired roughness, specular gloss and so forth.

The structure of the surface of the base layer can be made "highly structured" (i.e. low gloss and high roughness) in a controlled manner simply by selecting a chill roll having the desired surface profile. The structured surface of the resultant base layer is a mirror image of the surface of the chill roll.

Chill rolls having a rough surface profile may be produced by chrome plating a chill roll body and then sandblasting the chrome surface to create surface roughness. This forms a multitude of recesses, usually very fine, on the surface of the chill roll. Depending on the type and size of the sandblasting material and the duration of the treatment, silky, lustre or matte surface can be produced.

Thus the base layer preferably comprises a paper substrate and a polymer wherein the polymer is bonded to the paper and provides a textured surface profile thereon.

Preferably the base layer has an average surface roughness (Sa) of from 0.9 to 5 μm, more preferably 1.0 to 4 μm and especially 1.1 to 3.9 μm.

Preferred base layers are not glossy photographic paper derived from glossy supports generally do not make a noise when turned in a photo album, for example they have a silk, lustre or matte finish. The base layer is optionally coated or laminated with a polymer of an alpha-olefin, particularly having 2 to 10 carbon atoms, for example, polyethylene, polypropylene, ethylene-butene copolymers, etc., or synthetic resin films the surface of which has been roughened to improve the adhesion to other high molecular weight materials and improve printability. If desired the lamination of the polymer on the paper is done via a multi-layer using a co-extrusion technique having pigment in an intermediate polymer layer.

Preferred base layers are photographic grade base papers, optionally laminated on one or both sides with a polyethylene resin, preferably with a ratio of resin weight of top-side resin to back-side ranging from 0.70:1 to 1.30:1 and even more preferably between 0.85:1 and 1.15:1.

The base layer preferably has a thickness of 70 to 250 microns (e.g. 130 or 147 or 160 or 227 microns).

The base layer can be further coloured with a dye or a pigment if desired.

If the adhesion between the base layer and the light-sensitive emulsion layer(s) is insufficient, a layer having good adhesion to both of these elements can be employed as a subbing layer. For further improving the adhesive property of the base layer, the surface of the base layer can be subjected to a pre-treatment such as a corona discharge, an ultraviolet irradiation, an ozone treatment, a flame treatment, and the like.

Examples of commercially available paper base layers from Schoeller having the required surface roughness Sa (μm) and the standard deviation SD (μm) in include the lustre, matte and pyramid papers described in Table 1 below (obtained from Schoeller):

TABLE 1

| Surface | Commercial name (depending on thickness) | Sa (μm) | Thickness (μm) | Laminated top side (g/m$^2$) | Laminated back side (g/m$^2$) |
|---|---|---|---|---|---|
| Lustre | SALLF | 1.90 | 70-240 | 18-24 | 18-24 |
| | SPFLG | | | | |
| | STLLH | | | | |
| | SULLF | | | | |
| Matte | SAMLF | 0.99 | 70-240 | 18-24 | 18-24 |
| | SPFME | | | | |
| | SULMF | | | | |
| Pyramid | SPFSH | 3.78 | 227 | 17-24 | 17-24 |

In Table 1:

Sa means surface roughness in μm.

Laminated top side (g/m$^2$) means the amount of polyethylene laminated on the base paper topside in g/m$^2$.

Laminated back side (g/m$^2$) means the amount of polyethylene laminated on the base paper topside in g/m$^2$.

The average surface roughness (Sa) of the base layer may be measured by the method of ISO 25178-1-2016, e.g. using interferometry. Sa may be determined by calculating the arithmetic average of the absolute values of the height values z of all in the x, y-plane of the viewing area lying between measured points. In each case three measurements may be performed and the mean value of the individual measurements given in μm. A suitable device for measuring average surface roughness (Sa) is a Bruker Contour GT-K 3D profilometer in combination with "Vision 64" software. An area of 2 mm×2 mm of the paper base layer may be examined at a magnification of 10.9×, optionally using the conditions described in the Examples below.

The outer-most layer and light-sensitive emulsion layer(s) may be applied to a base layer by any suitable technique, including dip coating, air-knife coating, curtain coating, and extrusion coating. If desired, two or more layers can be coated at the same time using the techniques as described in U.S. Pat. Nos. 2,761,791, 3,508,947, 2,941,898 and 3,526,528.

Preferably the outer-most layer and the underlying light-sensitive emulsion layer(s) are applied to the base layer simultaneously, preferably using a slide coater or curtain coater, preferably at a coating speed higher than 200 m/min.

The photographic papers optionally further comprise an intermediate layer, a filter layer, a subbing layer, an antihalation layer, etc.

The photographic papers of this invention may be developed, after exposure, to form colour images, to give what are often referred to as photographs. Development processing may include several steps (for example, a combination of bleaching, fixing, bleach-fixing, stabilizing, washing, etc.) and can be effected at a temperature below about 20° C., or higher temperatures, and, if desired, at above about 30° C., and preferably at about 32° C. to 60° C. Again, the steps need not always be effected at the same temperature, and they can be carried out at higher or lower temperatures.

Colour developers are alkaline aqueous solutions containing a compound whose oxidized product reacts with a colour coupler to form a dye, that is, containing, as a developing agent, p-phenylenediamines such as N,N-diethyl-p-phenylenediamine, N,N-diethy-3-methyl-p-phenylenediamine, 4-amino-3-methyl-N-ethyl-N-methanesulfonamidoethylaniline, 4-amino-3-methyl-N-ethyl-N-.beta.-hydroxyethylaniline and N-ethyl-N-.beta.-hydroxyethyl-p-phenylenediamine, or salts thereof such as the hydrochlorides, sulfates and sulfites thereof. The alkaline aqueous solution has a pH higher than about 8, preferably from 9 to 12. The compounds as described in U.S. Pat. Nos. 2,193,015 and 2,592,364 can also been used as a developing agent. The colour developers can contain, in addition to the above developing agent, a salt such as sodium sulfate; a pH modifier such as sodium hydroxide, sodium carbonate or sodium phosphate; a buffer, for example, an acid such as acetic acid or boric acid, or a salt thereof; and a development accelerator, for example, various pyridinium compounds, cationic compounds, potassium nitrate and sodium nitrate as described in U.S. Pat. Nos. 2,648,604 and 3,671,247, polyethylene glycol condensates and the derivatives thereof as described in U.S. Pat. Nos. 2,533,990, 2,577,127 and 2,950,970, nonionic compounds such as polythioethers represented by the compounds as described in British Pat. Nos. 1,020,033 and 1,020,032, polymer compounds containing sulfite ester groups represented by the compounds as described in U.S. Pat. No. 3,068,097, as well as organic amines such as pyridine or ethanolamine, benzyl alcohol, hydrazines, etc. Moreover, the colour developers can contain an antifogging agent, for example, alkali metal bromides, alkali metal iodides, nitrobenzimidazoles as described in U.S. Pat. Nos. 2,496,940 and 2,656,271, as well as mercaptobenzimidazole, 5-methylbenztriazole, 1-phenyl-5-mercaptotetrazole, compounds for rapid processing as described in U.S. Pat. Nos. 3,113,864, 3,342,596, 3,295,976, 3,615,522 and 3,597,199, thiosulfonyl compounds as described in GB 972,211, phenazine-N-oxides, antifogging agents as described in Manual of Scientific Photography, Vol. 2, pages 29-47, etc.; a stain- or sludge-preventing agent as described in U.S. Pat. Nos. 3,161,513 and 3,161,514, and British Pat. Nos. 1,030,442, 1,144,481 and 1,251,558; an agent for accelerating the interimage effect as described in U.S. Pat. No. 3,536,487; and an antioxidant such as a sulfite, hydrogen sulfite, hydroxylamine hydrochloride or formaldehyde-alkanolamine sulfite adducts.

All of the additives exemplified for each of the processing steps described above and the amount thereof employed are known in the art of colour photographic processing methods.

After colour development, the photographic papers are usually bleached and fixed. Bleach and fixation can be combined and, thus, a bleach-fix bath can be used. Many compounds can be used as a bleaching agent, but of these compounds, generally ferricyanide salts, dichromate salts, water-soluble iron (III) salts, water-soluble cobalt (III) salts, water-soluble copper (II) salts, water-soluble quinones, nitrosophenols, complex salts of an organic acid and a polyvalent cation such as iron (III), cobalt (III) or copper (II) (for example, metal complex salts of aminopolycarboxylic acids such as ethylenediaminetetraacetic acid, nitrilotriacetic acid, iminodiacetic acid or N-hydroxyethylethylenediaminetriacetic acid, malonic acid, tartaric acid, malic acid, diglycolic acid, or dithioglycolid acid, 2,6-dipicolinic acid copper complex salt, etc.), peroxy acids such a alkyl peroxy acids, persulfate salts, permanganate salts or hydrogen peroxide, hydrochlorides, chlorine, bromine, etc., are used, either individually or in an appropriate combination. In addition, bleach accelerators as described in U.S. Pat. Nos. 3,042,520 and 3,241,966 and the like can also be employed.

In the fixation step, any known fixing solutions can be used. For example, ammonium thiosulfate, sodium thiosulfate or potassium thiosulfate can be used as a fixing agent in an amount of about 50 to 200 g/litre and, in addition, a stabilizing agent such as sulfite salts or metabisulfite salts, a hardening agent such as potassium alum, a pH buffer such as acetate salts or borate salts, and the like can be present in the fixing solution. The fixing solutions have a pH of about 3 to 12, usually a pH of about 3 to 8.

Suitable bleaching agents, fixing agents and bleach-fix baths are described, e.g., in U.S. Pat. No. 3,582,322.

Image-stabilizing baths can also be employed according to the techniques as described in U.S. Pat. Nos. 2,515,121, 2,518,686 and 3,140,177.

Suitable processing steps as utilizing low replenishment rates in a short latent image time within 12 seconds after exposure of the photographic paper with laser (digital) scanning as described in U.S. Pat. No. 6,949,334 can also be employed.

According to a second aspect of the present invention there is provided a method for preparing a photographic paper comprising applying a composition to a base layer having an average surface roughness (Sa) of at least 0.7 μm and one or more light-sensitive emulsion layers, wherein the composition comprises a hydrophilic colloid binder and colloidal silica in a weight ratio of 0.05:1 to 0.28:1; and the amount of colloidal silica provided by the composition is in the range of 8 $mg/m^2$ to 280 $g/m^2$ of colloidal silica.

In this method the composition is preferably applied to the outermost light-sensitive emulsion layer at a coating speed higher than 200 m/min, more preferably higher than 300 m/min.

The composition is preferably applied to the outermost light-sensitive emulsion layer using a slide coater or curtain coater. In a preferred embodiment the composition and at least one light-sensitive emulsion layer (preferably at least three light-sensitive emulsion layers) are applied to the base layer simultaneously optionally along with the abovementioned composition (which forms the outermost layer).

The composition preferably comprises a liquid medium, a hydrophilic colloid binder and colloidal silica in a weight ratio of 0.05:1 to 0.28:1 (preferably 0.06 to 0.10) to (0.13 to 0.27) preferably wherein the colloidal silica has a mean particle size of 2.5 to 9 nm. Typical liquid media include water and mixtures comprising water and one or more water-miscible organic solvents.

Preferably the composition has a viscosity at 20° C. of 30 to 75 cP, more preferably 40 to 60 cP.

In one embodiment the photographic paper further comprises a hardening agent and the hydrophilic colloid binder in a ratio (R) satisfying the following equation:

$$R=(Hmol/HCg)$$

wherein:

R is greater than 0.00013;

Hmol is the total number of moles of hardening agent in the photographic paper; and HCg is the weight in grams of hydrophilic colloid binder in the photographic paper.

The method preferably further comprises the step of drying the composition after it has been applied to the base layer.

According to a third aspect of the present invention there is provided an album-book comprising one or more photographs comprising photographic paper according to the first aspect of the present invention.

To make full use of the advantages of the present invention, the album-book preferably comprises at least two of said photographs positioned such that the photographs are in face-to-face contact when the album book is closes. Usually there is no need to include an interleaf foil separating the faces of the photographs, although such an interleaf foil may be included if desired.

The invention is further explained by reference to the following non-limiting examples. Unless otherwise indicated herein, all parts, percents, ratios and the like are by weight.

In the Examples the average surface roughness (Sa) of the base layers was measured using a Bruker Contour GT-K 3D profilometer in combination with "Vision 64" software set up as follows (no Pt coating was necessary):

| Measurement Options | VSI/VSX mode |
|---|---|
| Magnification | 10.9x |
| Objective | 20x |
| FoV | 0.55x |
| Speed | 1x |

-continued

| Measurement Options | VSI/VSX mode |
|---|---|
| Back scan/length | 25 μm/30 μm |
| Threshold | 0.5% |
| Illumination/Intensity | Green/5.00% |
| Stitching | 2 × 2 mm |
| Terms removal (F-Operator) | Tilt only (Plane Fit) |
| Gaussian Regression Filter | Long Wavelength Pass, Order = 0, Type = Regular, Long Wavelength Cutoff (L-filter) 0.02 mm |
| N (amount of measurements) | 3 |

The average surface roughness (Sa) means the average roughness (in μm) as determined through filtering using the interferometer and software described above.

The base layers used in the Examples had the properties described in Table 2 below:

TABLE 2

| Base layer | Sa (μm) | Stand. Dev *. of Sa (μm) | Type | Thickness (μm) | Laminated top side ($g/m^2$) | Laminated backside ($g/m^2$) |
|---|---|---|---|---|---|---|
| LR-Glossy | 0.60 | 0.05 | SULGF | 130 | 22 | 16 |
| LR-Lustre | 1.90 | 0.06 | SULLF | 130 | 19 | 20 |
| LR-Matte | 0.99 | 0.07 | SULMF | 130 | 19 | 20 |
| LR-Pyramid | 3.78 | 0.02 | SPFSH | 227 | 19 | 21 |

*The standard deviation (Stand. Dev.) of Sa was determined from three measurements.

In Table 2, Sa, Laminated top side ($g/m^2$) and Laminated back side ($g/m^2$) have the meanings described above in relation to Table 1. The base layers were all obtained from Schoeller under the names indicated in the first and third columns of Table 2.

In the following experiments, base layers having an average surface roughness (Sa) of at least 0.7 μm were deemed to be 'rough'.

Quantification of Noise (Noise Test)

The test for squeaking sounds was performed as follows: The intensity of the squeaking sound has a direct relationship with the amplitude of the coefficient of kinetic friction (COF) in relative motion.

This COF was measured using a friction tester (a Thwing-Albert FP-2260).

A first piece of the photographic paper under test of dimensions 100 mm*250 mm was placed onto a flat surface. A weight of mass 0.4 Kg and square base of dimensions 6.4 cm×6.4 cm with a second piece of the photographic paper on the bottom was dragged along the first piece of photographic paper at a speed of 10 mm/min. The first 20 mm was mainly dominated by static friction, followed by steady movement after the 20 mm dominated by the kinetic coefficient of friction. The first piece of photographic paper (attached to the bottom of the weight) and the second piece of photographic paper were therefore in face-to-face contact. The resultant noise was related to the amplitude of de kinetic coefficient of friction, which is directly related to the standard deviation.

A standard deviation of more than 0.06 was deemed to be 'noisy' or 'squeaking'. In Table 4 below, a value of 0 indicates a fail (i.e. noisy due to a standard deviation of more than 0.06) and a value of 1 indicates a pass (i.e. not noisy due to a standard deviation of 0.06 or less).

Blocking Test Evaluation

The extent to which various photographic papers stick together was evaluated by the following blocking test.

Samples of developed photographic paper were each cut into 3.5 cm by 3.5 cm squares and two squares of each developed photographic paper were placed on each other (face-to-face). A weight of 200 g was placed on top of the two squares of photographic paper and stored for 24 hours in a conditioned room at 52° C. and 85% relative humidity. With the weight still in place, the squares of photographic paper were then put for 1 hour in a conditioned room at 25° C. and 60% relative humidity. From these squares of developed photographic paper the blocking (i.e. the extent to which the two face-to-face squares stuck together) was evaluated by the following procedure:

The two squares of developed photographic paper were pulled apart and the level of damage to the faces which had been in contact were scored as follows with 5 being the heaviest damage and 1. being no detectable damage:

5: Severely damaged: The base layer of the developed photographic paper was completely torn to give a totally unacceptable level of damage.

4: Damaged: About 50% of the base layer of the developed photographic paper was torn and the emulsion layers were damaged to give a very poor and unacceptable result.

3: The base layer of the developed photographic paper was NOT torn. However the emulsion layers were visibly damaged to give a poor and unacceptable result.

2: The base layer of the developed photographic paper was NOT torn. Damage to the emulsion damage could not be detected with the naked eye but was visible using a microscope. This was deemed to be a good result.

1: The base layer of the developed photographic paper was NOT torn and no damage to the emulsion layers was detected, even using a microscope. This was deemed to be a very good result.

EXAMPLES

The four base layers described in Table 2 above (LR-Pyramid, LR-Lustre, LR-Matte and LR-Glossy, all from Schoeller) were each coated, in one step, with 7 emulsion layers using a slide coater operated at a speed 300 m/min. The first six emulsion layers were identical in each case and were as described below. However the outer-most (seventh) layer was varied as described below in Table 3 in order to compare the performance of photographic papers comprising an outer-most layer according to the present invention with comparative photographic papers falling outside of the claims.

The silicas used in the Examples and Comparative Examples were colloidal silicas obtained from H. C. Starck under the trade name Levasil™.

The hardening agent used in the Examples and Comparative Examples is sodium 1-oxy-3,5-dichloro-s-triazine.

The following dyes (coating amounts in brackets) were included in the layers where indicated.

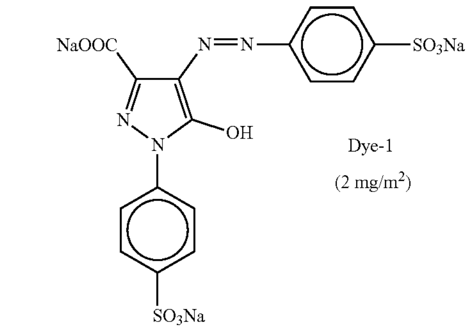

Dye-1

(2 mg/m²)

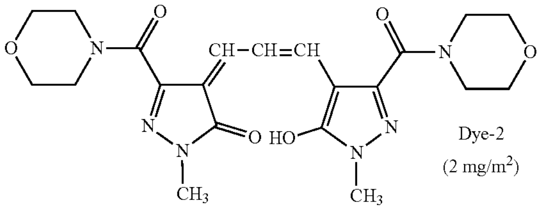

Dye-2

(2 mg/m²)

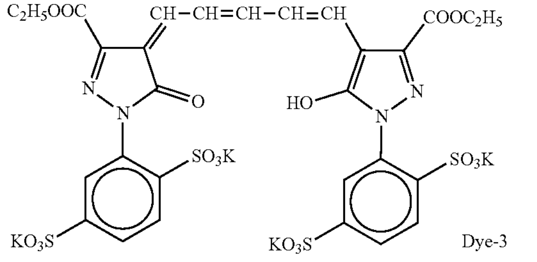

Dye-3

(3 mg/m²)

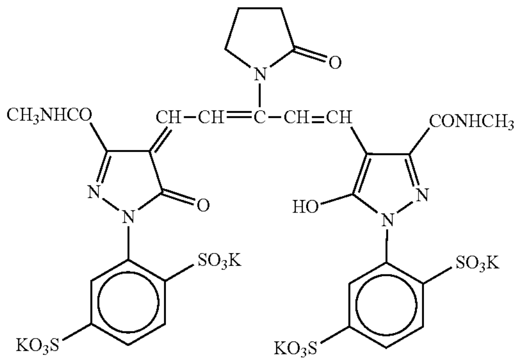

Dye-4

(7 mg/m²)

Layer Constitution

The composition of each layer is shown below. The numbers show coating amounts (g/$m^2$). In the case of the silver halide emulsion, the coating amount is in terms of silver.

First layer (Blue sensitive emulsion layer)

| Examples and Comparative Examples | Component | Amount |
|---|---|---|
| All | Silver chlorobromoiodide Emulsion A[#] (containing gold-sulfur sensitized cubic grains and being a 3:7 (by mole on a silver basis) mixture of large-sized | 0.24 |

-continued

First layer (Blue sensitive emulsion layer)

| Examples and Comparative Examples | Component | Amount |
|---|---|---|
| | Emulsion A-1 and a small-sized Emulsion A-2) | |
| | Gelatin | 1.25 |
| | Yellow coupler (Ex Y 1) | 0.34 |
| | Colour image stabilizer (Cpd-1) | 0.07 |
| | Colour image stabilizer (Cpd-2) | 0.04 |
| | Colour image stabilizer (Cpd-3) | 0.07 |
| | Colour image stabilizer (Cpd-8) | 0.02 |
| | Solvent (Solv-1) | 0.21 |

[#]= Preparation Emulsion A is disclosed on columns 94/95/96 in U.S. Pat. No. 6,921,631.

Second layer (Colour Mixing Inhibiting layer)

| Examples and Comparative Examples | Component | Amount |
|---|---|---|
| All | Gelatin | 1.15 |
| | Colour mixing inhibitor (Cpd-4) | 0.10 |
| | Colour mixing image stabilizer(Cpd-5) | 0.018 |
| | Colour image stabilizer(Cpd-6) | 0.13 |
| | Colour image stabilizer (Cpd-7) | 0.07 |
| | Dye-1 | 0.001 |
| | Dye-2 | 0.001 |
| | Dye-3 | 0.0015 |
| | Dye-4 | 0.0035 |
| | Solvent (Solv-1) | 0.04 |
| | Solvent (Solv-2) | 0.12 |
| | Solvent (Solv-5) | 0.11 |
| All | Hardening agent | 0.038 |

Third layer (Green sensitive emulsion layer)

| Examples and Comparative Examples | Component | Amount |
|---|---|---|
| All | Silver chlorobromoiodide Emulsion C* 0.14 (containing gold-sulfur sensitized cubic grains and being a 1:3 (by mole on a silver basis) mixture of large-sized Emulsion C-1 and a small-sized Emulsion C-2) | 0.14 |
| | Gelatin | 0.46 |
| | Magenta coupler (Ex M) | 0.15 |
| | Ultraviolet absorber (UV-A) | 0.14 |
| | Colour image stabilizer (Cpd-2) | 0.003 |
| | Colour image stabilizer (Cpd-5) | 0.002 |
| | Colour image stabilizer (Cpd-6) | 0.09 |
| | Colour image stabilizer (Cpd-8) | 0.02 |

-continued

| Third layer (Green sensitive emulsion layer) | | |
|---|---|---|
| Examples and Comparative Examples | Component | Amount |
| | Colour image stabilizer (Cpd-9) | 0.01 |
| | Colour image stabilizer (Cpd-10) | 0.01 |
| | Colour image stabilizer (Cpd-11) | 0.0001 |
| | Solvent (Solv-3) | 0.09 |
| | Solvent (Solv-4) | 0.18 |
| | Solvent (Solv-5) | 0.27 |

*= Preparation Emulsion C is disclosed in columns 96/97 in U.S. Pat. No. 6,921,631.

| Fourth layer (Colour Mixing Inhibiting layer) | | |
|---|---|---|
| Examples and Comparative Examples | Component | Amount |
| All | Gelatin | 0.68 |
| | Colour mixing inhibitor (Cpd-4) | 0.06 |
| | Colour image stabilizer (Cpd-5) | 0.011 |
| | Colour image stabilizer (Cpd-6) | 0.08 |
| | Colour image stabilizer (Cpd-7) | 0.04 |
| | Dye-1 | 0.001 |
| | Dye-2 | 0.001 |
| | Dye-3 | 0.0015 |
| | Dye-4 | 0.0035 |
| | Solvent (Solv-1) | 0.02 |
| | Solvent (Solv-2) | 0.07 |
| | Solvent (Solv-5) | 0.065 |
| All | Hardening agent | 0.068 |

| Fifth layer (Red sensitive emulsion layer) | | |
|---|---|---|
| Examples and Comparative Examples | Component | Amount |
| All | Silver chlorobromoiodide Emulsion E$^{\$}$ (containing gold-sulfur sensitized cubic grains and being a 5:5 (by mole on a silver basis) mixture of large-sized Emulsion E-1 and a small-sized Emulsion E-2) | 0.10 |
| | Gelatin | 1.11 |
| | Cyan coupler (ExC-1) | 0.02 |

-continued

| Fifth layer (Red sensitive emulsion layer) | | |
|---|---|---|
| Examples and Comparative Examples | Component | Amount |
| | Cyan coupler (ExC-3) | 0.01 |
| | Cyan coupler (ExC-4) | 0.11 |
| | Cyan coupler (ExC-5) | 0.01 |
| | Colour image stabilizer (Cpd-1) | 0.01 |
| | Colour image stabilizer (Cpd-6) | 0.06 |
| | Colour image stabilizer (Cpd-7) | 0.02 |
| | Colour image stabilizer (Cpd-9) | 0.04 |
| | Colour image stabilizer (Cpd-10) | 0.01 |
| | Colour image stabilizer (Cpd-14) | 0.01 |
| | Colour image stabilizer (Cpd-15) | 0.12 |
| | Colour image stabilizer (Cpd-16) | 0.01 |
| | Colour image stabilizer (Cpd-17) | 0.01 |
| | Colour image stabilizer (Cpd-18) | 0.07 |
| | Colour image stabilizer (Cpd-20) | 0.01 |
| | Ultraviolet absorber (UV-7) | 0.01 |
| | Solvent (Solv-5) | 0.15 |

$^{\$}$= Preparation Emulsion E is disclosed in columns 97/98 in U.S. Pat. No. 6,921,631.

| Sixth layer (Ultraviolet Absorbing layer) | | |
|---|---|---|
| Examples and Comparative Examples | Component | Amount |
| All | Gelatin | 0.46 |
| | Ultraviolet absorber (UV-B) | 0.35 |
| | Compound (S1-4) | 0.0015 |
| | Solvent (Solv-7) | 0.18 |
| All | Hardening agent | 0.046 |

Seventh Layer (Outer-Most Layer)

Fifty six compositions were prepared by mixing the ingredients indicated in Table 3 below (i.e. the 8 compositions A to H, each independently containing one of the 7 colloidal silicas indicated in the final row, making 8×7 compositions in total=56). These 56 compositions were then applied to the sixth layer mentioned above on each of the base layers such that the resultant, outer-most layer, after drying, comprised the amounts of hydrophilic colloid binder and colloidal silica indicated in Table 4 below (in g/m$^2$). Thus the outer-most layers each comprised colloidal silica having a mean particle size of 3, 9, 12, 17, 34, 70 or 100 nm. The compositions had a pH of 9.5 at 40° C.

TABLE 3

| All units in g/m$^2$ | Composition | | | | | | | |
|---|---|---|---|---|---|---|---|---|
| Components | A | B | C | D | E | F | G | H |
| Gelatin (Acid processed) (a hydrophilic colloid binder) | 0.86 | 0.86 | 0.86 | 0.86 | 0.86 | 0.86 | 0.86 | 0.86 |
| Acryl-modified copolymer of polyvinyl alcohol (modification degree: 17%) (a hydrophilic colloid binder) | 0.03 | 0.03 | 0.03 | 0.03 | 0.03 | 0.03 | 0.03 | 0.03 |
| Polymethyl methacrylate mean particle size 4um | 0.02 | 0.02 | 0.02 | 0.02 | 0.02 | 0.02 | 0.02 | 0.02 |

TABLE 3-continued

| All units in g/m² | Composition | | | | | | | |
|---|---|---|---|---|---|---|---|---|
| Components | A | B | C | D | E | F | G | H |
| Surface active agents (Cmp-13) | 0.14 | 0.14 | 0.14 | 0.14 | 0.14 | 0.14 | 0.14 | 0.14 |
| Liquid paraffin | 0.02 | 0.02 | 0.02 | 0.02 | 0.02 | 0.02 | 0.02 | 0.02 |
| Coloidal silicas: A1-H1 = 100 nm A2-H2 = 70 nm A3-H3 = 34 nm A4-H4 = 17 nm A5-H5 = 12 nm A6-H6 = 9 nm A7-H7 = 3 nm | 0.004 | 0.008 | 0.04 | 0.08 | 0.175 | 0.225 | 0.3 | 0.5 |

Results

The extent to which various photographic papers comprising an outer-most layer derived from the 56 compositions described in Table 3 made a noise when turned, bent and/or moved in a photobook was evaluated in the test described above as the "Noise Test". The results on are shown in Tables 4 to 9 below in which 1 indicates "not noisy" and 0 indicates "noisy:

TABLE 4

Noise Results on LR-Lustre Base Layer (Sa of 1.9 μm)

| Composition used to form the outer-most layer | Amount of colloidal silica in outer-most layer (mg/m²) | Average diameter of colloidal silica particles (nm) 100 | 70 | 34 | 17 | 12 | 9 | 3 |
|---|---|---|---|---|---|---|---|---|
| | | Result of noise test | | | | | | |
| A | 4 | 0 | 1 | 1 | 1 | 1 | 1 | 1 |
| B | 8 | 0 | 1 | 1 | 1 | 1 | 1 | 1 |
| C | 40 | 0 | 1 | 1 | 1 | 1 | 1 | 1 |
| D | 80 | 0 | 1 | 1 | 1 | 1 | 1 | 1 |
| E | 175 | 0 | 1 | 1 | 1 | 1 | 1 | 1 |
| F | 225 | 0 | 1 | 1 | 1 | 1 | 1 | 1 |
| G | 300 | 0 | 0 | 0 | 0 | 0 | 0 | 0 |
| H | 500 | 0 | 0 | 0 | 0 | 0 | 0 | 0 |

TABLE 5

Noise Results on LR-Matte Base Layer (Sa of 0.99 μm)

| Composition used to form the outer-most layer | Amount of colloidal silica in outer-most layer (mg/m²) | Mean particle size of colloidal silica (nm) 100 | 70 | 34 | 17 | 12 | 9 | 3 |
|---|---|---|---|---|---|---|---|---|
| | | Result of noise test | | | | | | |
| A | 4 | 0 | 1 | 1 | 1 | 1 | 1 | 1 |
| B | 8 | 0 | 1 | 1 | 1 | 1 | 1 | 1 |
| C | 40 | 0 | 1 | 1 | 1 | 1 | 1 | 1 |
| D | 80 | 0 | 1 | 1 | 1 | 1 | 1 | 1 |
| E | 175 | 0 | 1 | 1 | 1 | 1 | 1 | 1 |
| F | 225 | 0 | 1 | 1 | 1 | 1 | 1 | 1 |
| G | 300 | 0 | 0 | 0 | 0 | 0 | 0 | 0 |
| H | 500 | 0 | 0 | 0 | 0 | 0 | 0 | 0 |

TABLE 6

Noise Results on LR-Glossy Base Layer (Sa of 0.6 μm)

| Composition used to form the outer-most layer | Amount of colloidal silica in outer-most layer (mg/m²) | Mean particle size of colloidal silica (nm) 100 | 70 | 34 | 17 | 12 | 9 | 3 |
|---|---|---|---|---|---|---|---|---|
| | | Result of noise test | | | | | | |
| A | 4 | 1 | 1 | 1 | 1 | 1 | 1 | 1 |
| B | 8 | 1 | 1 | 1 | 1 | 1 | 1 | 1 |
| C | 40 | 1 | 1 | 1 | 1 | 1 | 1 | 1 |
| D | 80 | 1 | 1 | 1 | 1 | 1 | 1 | 1 |
| E | 175 | 1 | 1 | 1 | 1 | 1 | 1 | 1 |
| F | 225 | 1 | 1 | 1 | 1 | 1 | 1 | 1 |
| G | 300 | 1 | 1 | 1 | 1 | 1 | 1 | 1 |
| H | 500 | 1 | 1 | 1 | 1 | 1 | 1 | 1 |

Note: the results in Table 6 show that glossy base layers do not suffer from noise problems.

Blocking Test Results

The results in the blocking test were scored 1 to 5 as described above in which 1 is the best result (photographic papers were not damaged) and 5 is the worst result:

TABLE 7

Blocking Results on LR-Lustre Base Layer (Sa of 1.9 μm)

| Composition used to form the outer-most layer | Amount of colloidal silica in outer-most layer (mg/m²) | Mean particle size of colloidal silica (nm) 70 | 34 | 17 | 12 | 9 | 3 |
|---|---|---|---|---|---|---|---|
| | | Result of blocking test | | | | | |
| A | 4 | 3 | 3 | 2 | 2 | 2 | 2 |
| B | 8 | 2 | 2 | 2 | 2 | 2 | 2 |
| C | 40 | 1 | 1 | 1 | 1 | 1 | 1 |
| D | 80 | 1 | 1 | 1 | 1 | 1 | 1 |
| E | 175 | 1 | 1 | 1 | 1 | 1 | 1 |
| F | 225 | 1 | 1 | 1 | 1 | 1 | 1 |
| G | 300 | 1 | 1 | 1 | 1 | 1 | 1 |
| H | 500 | 1 | 1 | 1 | 1 | 1 | 1 |

TABLE 8

Blocking Results on LR-Matte Base Layer (Sa of 0.99 μm)

| Composition used to form the outer-most layer | Amount of colloidal silica in outer-most layer (mg/m²) | Mean particle size of colloidal silica (nm) 70 | 34 | 17 | 12 | 9 | 3 |
|---|---|---|---|---|---|---|---|
| | | Result of blocking test | | | | | |
| A | 4 | 3 | 3 | 2 | 2 | 2 | 2 |
| B | 8 | 2 | 2 | 2 | 2 | 2 | 2 |

TABLE 8-continued

Blocking Results on LR-Matte Base Layer (Sa of 0.99 μm)

| Composition used to form the outer-most layer | Amount of colloidal silica in outer-most layer (mg/m²) | Mean particle size of colloidal silica (nm) 70 | 34 | 17 | 12 | 9 | 3 |
|---|---|---|---|---|---|---|---|
| | | Result of blocking test | | | | | |
| C | 40 | 1 | 1 | 1 | 1 | 1 | 1 |
| D | 80 | 1 | 1 | 1 | 1 | 1 | 1 |
| E | 175 | 1 | 1 | 1 | 1 | 1 | 1 |
| F | 225 | 1 | 1 | 1 | 1 | 1 | 1 |
| G | 300 | 1 | 1 | 1 | 1 | 1 | 1 |
| H | 500 | 1 | 1 | 1 | 1 | 1 | 1 |

TABLE 9

Blocking Results on LR-Glossy Base Layer (Sa of 0.6 μm)

| Composition used to form the outer-most layer | Amount of colloidal silica in outer-most layer (mg/m²) | Mean particle size of colloidal silica (nm) 70 | 34 | 17 | 12 | 9 | 3 |
|---|---|---|---|---|---|---|---|
| | | Result of blocking test | | | | | |
| A | 4 | 5 | 5 | 5 | 5 | 5 | 4 |
| B | 8 | 5 | 5 | 5 | 4 | 4 | 4 |
| C | 40 | 5 | 5 | 4 | 4 | 4 | 4 |
| D | 80 | 5 | 4 | 4 | 4 | 3 | 2 |
| E | 175 | 5 | 3 | 3 | 2 | 2 | 2 |
| F | 225 | 5 | 3 | 3 | 1 | 1 | 1 |
| G | 300 | 5 | 3 | 3 | 1 | 1 | 1 |
| H | 500 | 5 | 4 | 3 | 1 | 1 | 1 |

The structural formulae of the compounds used herein are provided below:

(ExY-1): Yellow coupler

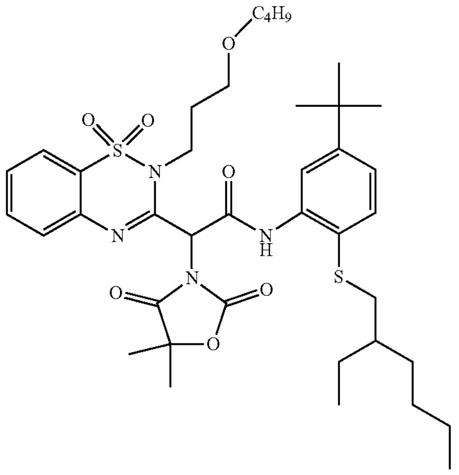

(ExM) Magenta Coupler

40:40:20 (by mole) mixture of (1), (2) and (3):

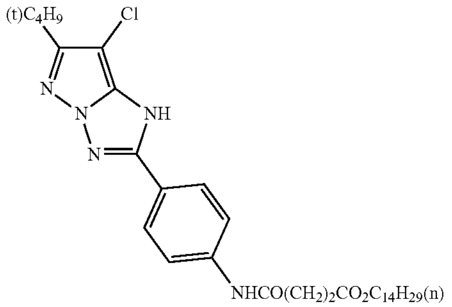

(1)

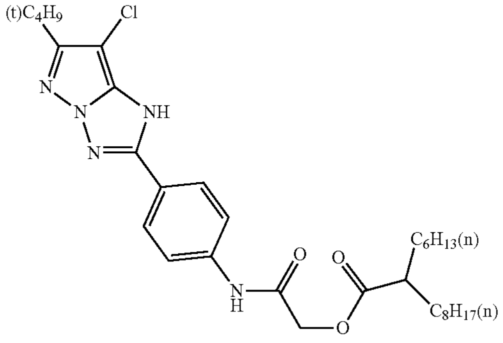

(2)

-continued
(3)
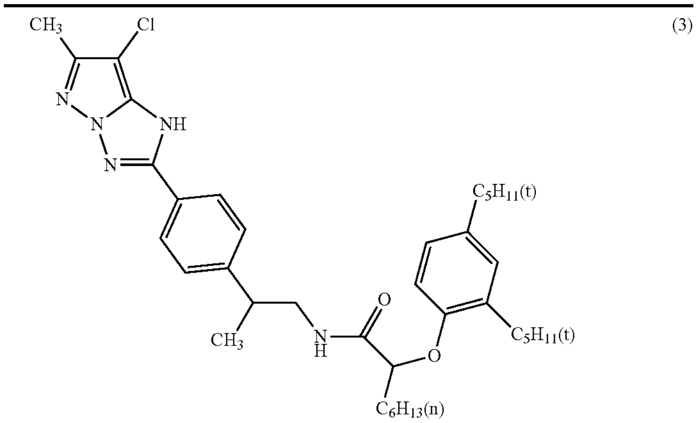
(ExC-1)
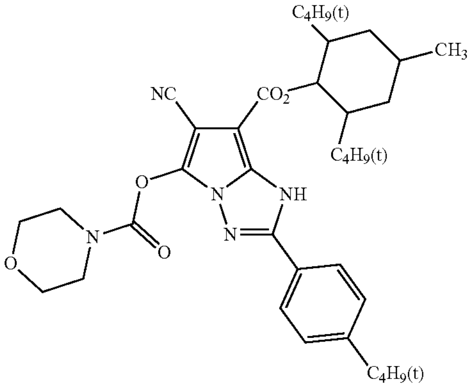
Cyan coupler
(Cpd-1)
$-(CH_2CH)n-$
$CONHC_4H_9(t)$
(ExC-3)
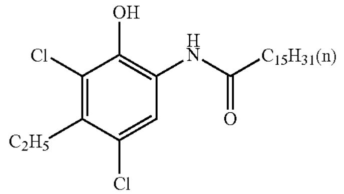
Cyan coupler
(ExC-4)
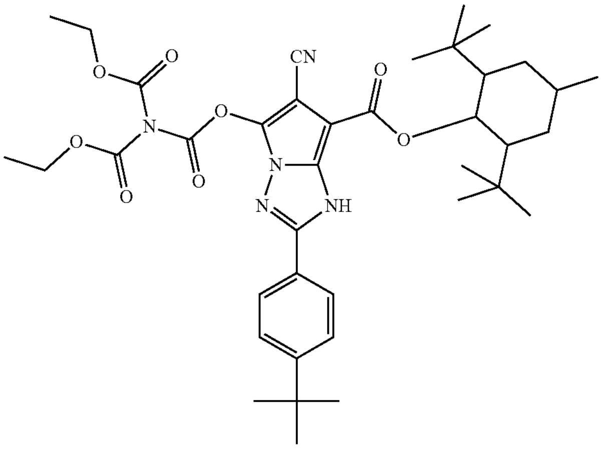 [SMILES: CCOC(=O)N(C(=O)OCC)C(=O)Oc1c(C#N)c(C(=O)OC2C(C(C)(C)C)CC(C)CC2C(C)(C)C)c2[nH]c(-c3ccc(C(C)(C)C)cc3)nn12]

-continued
Cyan coupler
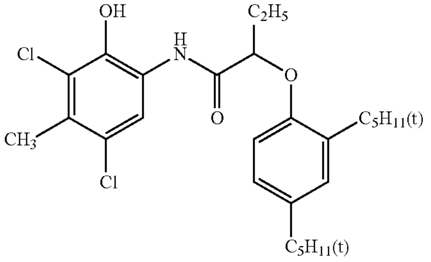
(ExC-5)
Cyan coupler
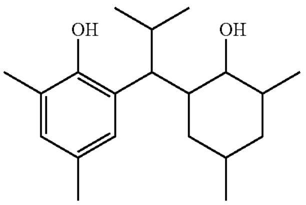
(Cpd-1)
Colour image stabiliser
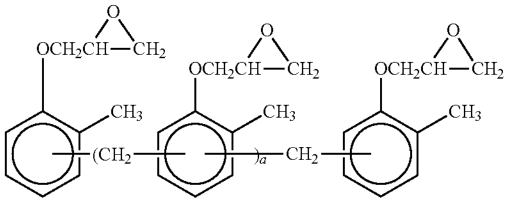
(Cpd-3)
n = 7-8 (on average)
Colour image stabilizer
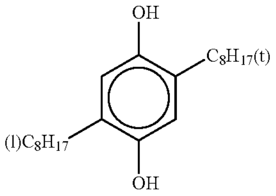
(Cpd-4)
Colour mixing stabilizer
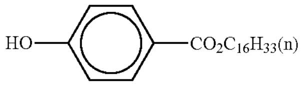
(Cpd-5)
Colour image stabilizer
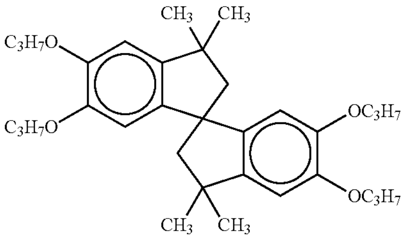
(Cpd-8)

-continued
Colour image stabilizer
(Cpd-9)
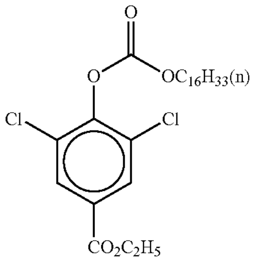
Colour image stabilizer
(Cpd-10)
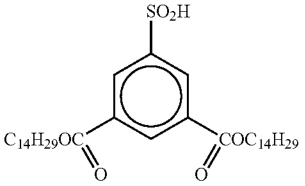
Colour image stabilizer
7:3 (by mole) mixture of (Cmp-13)
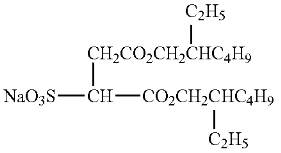
and
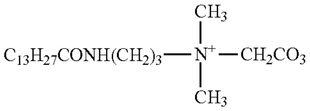
(Cpd-14)
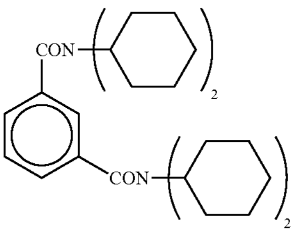
(Cpd-15)
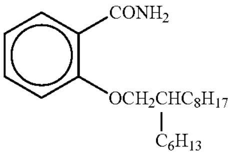
(Cpd-16)
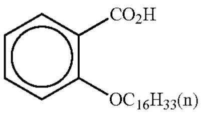
(Cpd-17)
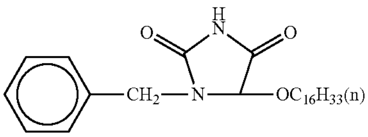

-continued
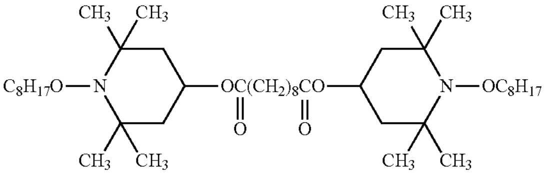
(Cpd-18)
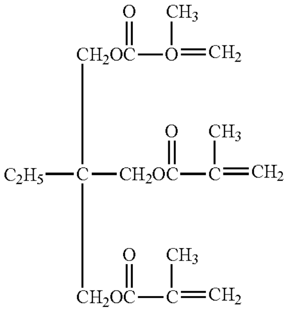
(Cpd-20)
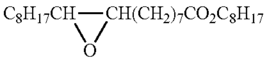
(Solv-1)
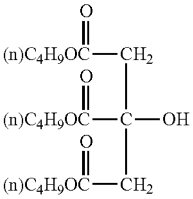
(Solv-2)
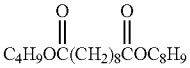
(Solv-3)
$O{=}P(OC_6H_{13}(n))_3$
(Solv-4)
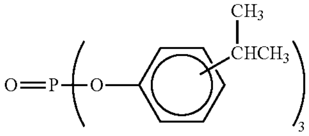
(Solv-5)
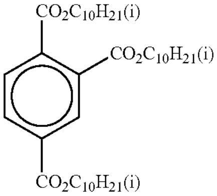
(Solv-7)
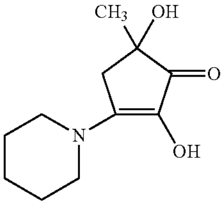
(S1-4)

-continued
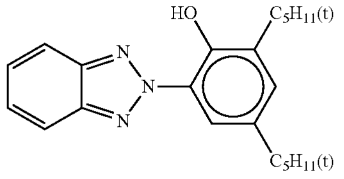
(UV-1)
Ultraviolet Absorbent
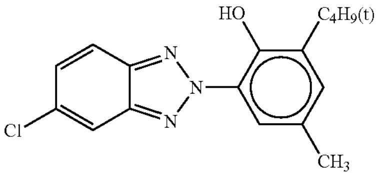
(UV-2)
Ultraviolet Absorbent
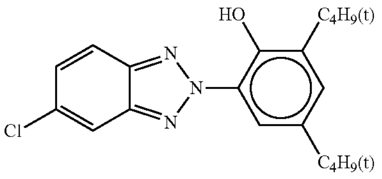
(UV-3)
Ultraviolet Absorbent
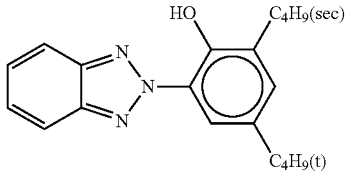
(UV-5)
Ultraviolet Absorbent
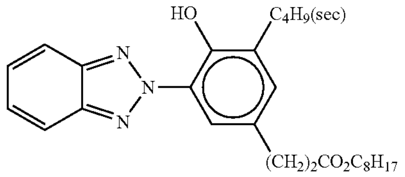
(UV-6)
Ultraviolet Absorbent -continued

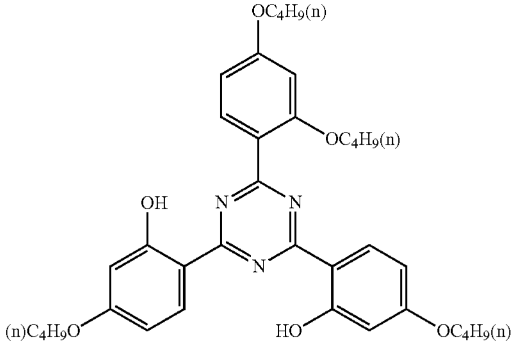

(UV-7)

Ultraviolet Absorbent

UV-A: 7:2:2 (by weight) mixture of UV-1, UV-2 and UV-3

UV-B: 13:3:3:5:3 (by weight) mixture of UV-1, UV-2, UV-3, UV-5 and UV-6

The invention claimed is:

1. A photographic paper comprising a base layer having an average surface roughness (Sa) of at least 0.7 μm and an outer-most layer comprising a hydrophilic colloid binder and colloidal silica and one or more light sensitive emulsion layers between the outer-most layer and the base layer, wherein:

(i) the weight ratio of colloidal silica to hydrophilic colloid binder in the outer-most layer is 0.05:1 to 0.28:1;

(ii) the amount of colloidal silica present in the outer-most layer is in the range of 8 mg/$m^2$ to 225 mg/$m^2$; and (iii) the colloidal silica has a mean particle size of 3 to 70 nm.

2. The photographic paper according to claim 1 wherein the base layer has a specular gloss of less than 50%, when measured at an angle of 60 degrees by the method of JIS Z8741.

3. The photographic paper according to claim 1 wherein the base layer is a laminated paper support.

4. The photographic paper according to claim 1 wherein the amount of colloidal silica present in the outer-most layer is in the range of 10 mg/$m^2$ to 225 mg/$m^2$.

5. The photographic paper according to claim 1 wherein the amount of colloidal silica present in the outer-most layer is in the range of 40 mg/$m^2$ to 225 mg/$m^2$.

6. The photographic paper according to claim 5 wherein the base layer comprises a paper substrate and a polymer wherein the polymer is bonded to the paper and provides a textured surface profile thereon.

7. The photographic paper according to claim 1 wherein the amount of colloidal silica present in the outer-most layer is in the range of 40 mg/$m^2$ to 225 mg/$m^2$.

8. A lustre or matte photographic paper according to claim 1.

9. A method for preparing a photographic paper comprising applying a composition to a base layer having an average surface roughness (Sa) of at least 0.7 μm and one or more light-sensitive emulsion layers, wherein: the composition comprises a hydrophilic colloid binder and colloidal silica in a weight ratio of 0.05:1 to 0.28:1; the colloidal silica has a mean particle size of 3 to 70 nm; and the amount of colloidal silica provided by the composition is in the range of 8 mg/$m^2$ to 225 mg/$m^2$ of colloidal silica.

10. The method according to claim 9 wherein the composition further comprises a hardening agent and the hydrophilic colloid binder in the ratio (R) satisfying the following equation:

$$R=(Hmol/HCg)$$

wherein:

R is greater than 0.00013;

Hmol is the number of moles of hardening agent in the compositions; and

HCg is the weight in grams of hydrophilic colloid binder in the composition.

11. The method according to claim 9 wherein the composition is applied to the base layer at a coating speed higher than 200 m/min.

12. The method according to claim 9 wherein the composition is applied to the base layer using a slide coater or curtain coater.

13. The method according to claim 9 wherein the composition and at least one light-sensitive emulsion layer are applied to the support simultaneously.

14. An album-book comprising one or more photographs comprising photographic paper according to claim 1.

15. The album-book according to claim 14 comprising at least two of said photographs positioned such that the photographs are in face-to-face contact when the album book is closed.

16. The album-book according to claim 14 which is free from interleaf foils.

* * * * *